US010839032B2

(12) United States Patent
Li (10) Patent No.: US 10,839,032 B2
(45) Date of Patent: Nov. 17, 2020

(54) NETWORK RESOURCE RECOMMENDATION METHOD AND COMPUTER DEVICE (71) Applicant: HUAWEI TECHNOLOGIES CO., LTD., Guangdong (CN)

(72) Inventor: Guilin Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 196 days.

(21) Appl. No.: 16/038,892

(22) Filed: Jul. 18, 2018

(65) Prior Publication Data
US 2018/0322212 A1 Nov. 8, 2018

Related U.S. Application Data (63) Continuation of application No. PCT/CN2016/111522, filed on Dec. 22, 2016.

(30) Foreign Application Priority Data

Jan. 19, 2016 (CN) .......................... 2016 1 0033707

(51) Int. Cl.
G06F 16/00 (2019.01)
G06F 16/9535 (2019.01)
G06F 16/2457 (2019.01)

(52) U.S. Cl.
CPC .......... *G06F 16/9535* (2019.01); *G06F 16/00* (2019.01); *G06F 16/24578* (2019.01)

(58) Field of Classification Search
CPC . G06F 16/9535; G06F 16/00; G06F 16/24578
See application file for complete search history.

(56) References Cited

U.S. PATENT DOCUMENTS 7,228,492 B1* 6/2007 Graham .............. G06F 16/9535
715/234
7,596,549 B1* 9/2009 Issa ......................... G06F 16/48
(Continued)

FOREIGN PATENT DOCUMENTS

CN 101271558 A 9/2008
CN 101339562 A 1/2009
(Continued)

OTHER PUBLICATIONS

Shi, "An Improved Collaborative Filtering Recommendation Method Based on Timestamp", 2014, ICACT, pp. 784-788 (Year: 2014).*
(Continued)

*Primary Examiner* — Alexander Khong
(74) *Attorney, Agent, or Firm* — Fish & Richardson P.C.

(57) ABSTRACT

The present invention discloses a network resource recommendation method, including: determining a first interest model according to a user behavior record in a current time window; calculating a similarity between any two interest models in the first interest model, a second interest model, and a third interest model, where a time window corresponding to the second interest model is adjacent to the current time window, the third interest model is determined based on all user behavior records in a reference time window set, the reference time window set includes N time windows prior to the time window corresponding to the second interest model; determining a fourth interest model and a recommendation algorithm according to the calculated similarity between any two interest models; generating a network resource recommendation list according to the fourth interest model and the recommendation algorithm; and making a recommendation according to the network resource recommendation list.

14 Claims, 4 Drawing Sheets

(56) References Cited

U.S. PATENT DOCUMENTS

| | | | | |
|---|---|---|---|---|
| 8,055,655 | B1* | 11/2011 | He | G06F 16/248 707/727 |
| 9,075,882 | B1* | 7/2015 | Ward | G06Q 30/0631 |
| 2009/0276368 | A1* | 11/2009 | Martin | G06Q 40/02 705/36 R |
| 2010/0186041 | A1 | 7/2010 | Chu et al. | |
| 2014/0100952 | A1* | 4/2014 | Bart | G06Q 30/0264 705/14.53 |
| 2015/0213492 | A1* | 7/2015 | Aleksandrovsky | G06Q 30/0255 705/14.53 |
| 2016/0191450 | A1* | 6/2016 | Lineberger | G06Q 50/01 709/206 |
| 2016/0307210 | A1* | 10/2016 | Agarwal | G06Q 10/06316 |
| 2017/0142133 | A1* | 5/2017 | Kallos | H04L 63/1408 |

FOREIGN PATENT DOCUMENTS

| | | |
|---|---|---|
| CN | 101866341 A | 10/2010 |
| CN | 102542489 A | 7/2012 |
| CN | 103744917 A | 4/2014 |
| CN | 104376058 A | 2/2015 |
| CN | 105224699 A | 1/2016 |

OTHER PUBLICATIONS

Ding et al., "Time Weight Collaborative Filtering", 2005, ACM, pp. 485-492 (Year: 2005).*

International Search Report and Written Opinion issued in International Application No. PCT/CN2016/111522 dated Feb. 27, 2018, 20 pages.

Haihong, "Study and Application of User Interest Model based on Theory of Cognitive Psychology," Dissertation submitted to Shanghai University for the Degree of Master in Engineering, Feb. 2014, 96 pages.

Office Action issued in Chinese Application No. 201610033707.1 dated Jan. 3, 2020, 25 pages (with English translation).

Pierpaolo Basile et al: "Modeling Short-Term Preferences in Time-Aware Recommender Systems", Jun. 1, 2015, XP055502442, 11 pages.

Stefanidis Kostas et al: "A Framework for Modeling, Computing and Presenting Time-Aware Recommendations", Medical Image Computing and Computer-Assisted Intervention—MICCAI 2015:18th International Conference, Munich, Germany, Oct. 5-9, 2015;Proceedings; [Lecture Notes in Computer Science;Lect.Notes Computer], Springer International Publishing, CH, XP047042266, 27 pages.

Ivan Koychev: "Tracking Changing User Interests through Prior-Learning of Context" In:"Medical image computing and computer-assisted intervention—MICCAI 2015:18th international conference, Munich, Germany, Oct. 5-9, 2015; proceedings", Jan. 1, 2002, Springer International Publishing, Cham 032548, XP055502498, 10 pages.

Baocheng Huang et al: "Research and Application of Personalized Modeling Based on Individual Interest in Mining",Abstract and Applied Analysis, vol. 2014, Jan. 1, 2014, pp. 1-8, XP055502435, 9 pages.

Extended European Search Report issued in European Application No. 16886134.2 dated Sep. 5, 2018, 9 pages.

* cited by examiner

S203-a1
If both a first similarity and a second similarity are greater than or equal to a preset similarity, the computer device determines a fourth interest model according to the second interest model, the third interest model, and a first formula

S203-a2
If the first similarity is greater than or equal to the preset similarity, and the second similarity is less than the preset similarity, the computer device determines the fourth interest model according to a first interest model, the second interest model, and the first formula

S203-a3
If the first similarity is less than the preset similarity, and the second similarity is greater than or equal to the preset similarity, the computer device determines the fourth interest model according to the first interest model, the third interest model, and the first formula

S203-a4
If the first similarity is less than the preset similarity, the second similarity is less than the preset similarity, and the third similarity is greater than or equal to the preset similarity, the computer device determines the fourth interest model according to the second interest model, the third interest model, and the first formula

S203-a5
If the first similarity is less than the preset similarity, the second similarity is less than the preset similarity, and the third similarity is less than the preset similarity, the computer device uses the third interest model as the fourth interest model

NETWORK RESOURCE RECOMMENDATION METHOD AND COMPUTER DEVICE

CROSS-REFERENCE TO RELATED APPLICATIONS

This application is a continuation of International Application No. PCT/CN2016/111522, filed on Dec. 22, 2016, which claims priority to Chinese Patent Application No. 201610033707.1, filed on Jan. 19, 2016. The disclosures of the aforementioned applications are hereby incorporated by reference in their entireties.

TECHNICAL FIELD

The present invention relates to the field of communications technologies, and in particular, to a network resource recommendation method and a computer device.

BACKGROUND

The development of Internet technologies allows a user to implement more functions by using the Internet, such as online shopping, web page browsing, online video, and online games. The Internet generates a huge amount of data every moment. How to effectively utilize the data has become a concern of the world. After years of research, exploration and utilization of added value of the data gradually become mature, and are mainly applied to network resource recommendation systems in fields of e-commerce, online information application (such as online news, online music, and online video), and the like. Network resource recommendation means recommending information that interests a user to the user according to interest characteristics of the user, so as to avoid continuous user attrition caused by information overload due to rapid growth of information.

Currently, a network resource recommendation method is determining an interest model for a current recommendation according to feedback information of a user for a network resource recommendation list (for example, a click-through of the user to a recommendation event in the network resource recommendation list). If there is little or no feedback information, this network resource recommendation method may reduce accuracy of the determined interest model for the current recommendation, and finally reduce accuracy of a recommendation result.

SUMMARY

Embodiments of the present invention provide a network resource recommendation method and a server, so as to improve accuracy of a recommendation result.

According to a first aspect, the present invention provides a network resource recommendation method. A second interest model and a third interest model are stored in a computer device. The second interest model is an interest model whose time window is adjacent to a current time window and prior to the current time window. The third interest model is an interest model combined by interest models of a user in different time windows (prior to the time window corresponding to the second interest model). When the computer device detects a user behavior record of the user in the current time window, the computer device determines a first interest model according to the user behavior record in the current time window; calculates a similarity between any two interest models in the first interest model, the second interest model, and the third interest model; determines a fourth interest model and a recommendation algorithm according to the calculated similarity between any two interest models; generates a network resource recommendation list according to the fourth interest model and the recommendation algorithm; and makes a recommendation according to the network resource recommendation list. It may be learned that, in this solution, an interest model for a current recommendation is determined not according to feedback information of a user for a network resource recommendation list, but according to a user behavior record, thereby responding to a user interest change in an accurate and timely manner, and improving accuracy of a recommendation result.

In a possible design, the similarity that is between any two interest models and calculated by the computer device includes a first similarity, a second similarity, and a third similarity. The first similarity is a similarity between the first interest model and the second interest model, the second similarity is a similarity between the first interest model and the third interest model, and the third similarity is a similarity between the second interest model and the third interest model.

In a possible design, a specific implementation in which the computer device determines the fourth interest model according to the calculated similarity between any two interest models is as follows:

When both the first similarity and the second similarity are greater than or equal to a preset similarity, the computer device detects that a user interest does not significantly change, and the computer device determines the fourth interest model according to the second interest model, the third interest model, and a first formula. This helps improve accuracy of the interest model for the current recommendation.

When the first similarity is greater than or equal to the preset similarity, and the second similarity is less than the preset similarity, the computer device detects that the user interest drifts, and the computer device determines the fourth interest model according to the first interest model, the second interest model, and the first formula. This helps improve accuracy of the interest model for the current recommendation.

When the first similarity is less than the preset similarity, and the second similarity is greater than or equal to the preset similarity, the computer device detects noise, and the computer device determines the fourth interest model according to the first interest model, the third interest model, and the first formula. This helps improve accuracy of the interest model for the current recommendation.

When the first similarity is less than the preset similarity, the second similarity is less than the preset similarity, and the third similarity is greater than or equal to the preset similarity, the computer device detects that the user interest does not change, and the computer device determines the fourth interest model according to the second interest model, the third interest model, and the first formula. This helps improve accuracy of the interest model for the current recommendation.

When the first similarity is less than the preset similarity, the second similarity is less than the preset similarity, and the third similarity is less than the preset similarity, the computer device detects noise, and the computer device uses the third interest model as the fourth interest model. This helps improve accuracy of the interest model for the current recommendation.

The first formula is:

$$M = \alpha A + \beta B$$

where M indicates the fourth interest model, A and B are any two interest models in the first interest model, the second interest model, and the third interest model, α indicates a weight of A, β indicates a weight of B, and a sum of α and β is equal to 1.

In a possible design, after the computer device determines the fourth interest model according to the second interest model, the third interest model, and the first formula, the computer device updates the third interest model to the fourth interest model.

In a possible design, after the computer device determines the fourth interest model according to the first interest model, the second interest model, and the first formula, the computer device determines a fifth interest model according to the second interest model, the third interest model, and the first formula, and updates the third interest model to the fifth interest model.

In a possible design, a specific implementation in which the computer device determines the recommendation algorithm according to the calculated similarity between any two interest models is as follows:

When both the first similarity and the second similarity are greater than or equal to the preset similarity, the computer device detects that the user interest does not significantly change, and the computer device uses a content-based collaborative filtering recommendation as the recommendation algorithm. In this case, the computer device uses the content-based collaborative filtering recommendation, and can ensure sensitivity to a current short-term interest while making a recommendation based on a long-term interest, thereby improving accuracy of the recommendation.

When the first similarity is greater than or equal to the preset similarity, and the second similarity is less than the preset similarity, the computer device detects that the user interest changes, and the computer device uses a content-based recommendation as the recommendation algorithm. In this case, the computer device uses the content-based recommendation, and can make a better recommendation according to a current short-term interest and capture a current new interest of a user, thereby improving accuracy of the recommendation.

When the first similarity is less than the preset similarity, and the second similarity is greater than or equal to the preset similarity, or if the first similarity is less than the preset similarity, and the second similarity is less than the preset similarity, or if the first similarity is less than the preset similarity, and the second similarity is less than the preset similarity, the computer device detects noise or detects that the user interest does not change, and the computer device uses a collaborative filtering-based recommendation as the recommendation algorithm. In this case, the computer device uses the collaborative filtering-based recommendation, and can ensure diversity of a recommendation to the maximum extent, thereby improving a success rate of the recommendation.

In a possible design, the interest model may be a vector model, and a specific implementation in which the computer device calculates the similarity between any two interest models in the first interest model, the second interest model, and the third interest model is as follows:

The computer device calculates, according to a second formula, a similarity between any two vector models in a first vector model, a second vector model, and a third vector model, where the second formula is:

$$\text{similarity} = \frac{A \cdot B}{\|A\| \cdot \|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

where the similarity indicates the similarity between any two vector models, A and B are any two vector models in the first vector model, the second vector model, and the third vector model, n indicates a total quantity of elements included in a vector model, and i indicates an $i^{th}$ element in the vector model.

According to a second aspect, the present invention provides a computer device, including modules for executing the method in the first aspect.

According to a third aspect, the present invention provides a computer device. The computer device includes a receiver, a transmitter, and a processor. The processor is configured to support the computer device to perform corresponding functions in the network resource recommendation method provided in the first aspect. The transmitter is configured to support communication between the computer device and a mobile network server. The computer device may further include a memory. The memory is configured to be coupled with the processor, and stores a program instruction and data that are indispensable to the computer device. The computer device may further include a communications interface used for communication between the computer device and another device or another communications network.

According to a fourth aspect, the present invention provides a computer storage medium, configured to store a computer software instruction used by the foregoing computer device. The computer software instruction includes a program designed for performing the foregoing aspects.

It may be teamed that, in the embodiments of the present invention, an interest model for a current recommendation is determined not according to feedback information of a user for a network resource recommendation list, but according to a user behavior record, thereby responding to a user interest change in an accurate and timely manner, and improving accuracy of a recommendation result.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 2.1 is a schematic flowchart of another network resource recommendation method according to an embodiment of the present invention;

FIG. 2.2 is a schematic flowchart of another network resource recommendation method according to an embodiment of the present invention.

DESCRIPTION OF EMBODIMENTS

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The following separately provides detailed descriptions.

In the specification, claims, and accompanying drawings of the present invention, the terms "first", "second", "third", "fourth", and so on are intended to distinguish between different objects but do not describe a specific order. In addition, the terms "including" and "having" and any other variants thereof are intended to cover a non-exclusive inclusion. For example, a process, a method, a system, a product, or a device that includes a series of steps or modules is not limited to the listed steps or modules, but optionally further includes a step or module that is not listed, or optionally further includes another inherent step or module of the process, the method, the product, or the device.

"Embodiment" mentioned in this specification implies that specific features, structures, or characteristics described with reference to an embodiment may be included in at least one embodiment of the present invention. This word appearing in various parts of the specification may not necessarily mean a same embodiment, or an independent or alternative embodiment mutually exclusive to another embodiment. A person skilled in the art explicitly and implicitly understands that an embodiment described in this specification may be combined with another embodiment.

Figure 1:
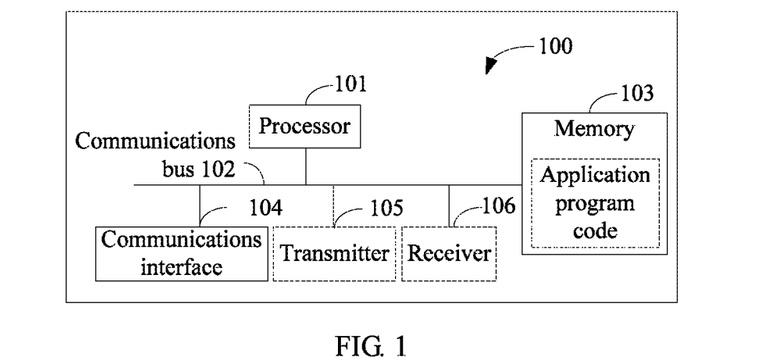
FIG. 1 is a schematic diagram of a computer device according to an embodiment of the present invention.

FIG. 1 is a schematic diagram of a computer device 100 according to an embodiment of the present invention. The computer device 100 includes at least one processor 101, a communications bus 102, a memory 103, at least one communications interface 104, a transmitter 105, and a receiver 106.

The processor 101 may be a general-purpose central processing unit (CPU), a microprocessor, an application-specific integrated circuit (ASIC), or one or more integrated circuits configured to control program execution of solutions of the present invention.

The communications bus 102 may include a channel, to transfer information between the foregoing components. By using any apparatus such as a transceiver, the communications interface 104 communicates with another device or another communications network, such as Ethernet, a radio access network (RAN), or wireless local area networks (WLAN).

The memory 103 may be a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, optical disc storage (including a compact disc, a laser disc, an optical disc, a digital versatile disc, a blue-ray disc, and the like), or magnetic disk storage medium or another magnetic storage device, or any other medium that can carry or store expected program code having an instruction or data structure form and can be accessed by using a computer. However, the memory is not limited herein. The memory may exist independently, and is connected to the processor by using the bus. Alternatively, the memory may be integrated with the processor.

The memory 103 is configured to store application program code used to execute the solutions of the present invention, and the execution is controlled by using the processor 101. The processor 101 is configured to execute the application program code stored in the memory 103.

The code stored in the memory 103 of the computer device shown in FIG. 1 may be used to execute a network resource recommendation method provided in the present invention. For example, a first interest model is determined according to a user behavior record in a current time window. A similarity between any two interest models in the first interest model, a second interest model, and a third interest model is calculated. A fourth interest model and a recommendation algorithm are determined according to the calculated similarity between any two interest models. A network resource recommendation list is generated according to the fourth interest model and the recommendation algorithm. A recommendation is made based on the network resource recommendation list.

During specific implementation, in an embodiment, the computer device 100 may further include the transmitter 105 and the receiver 106. The transmitter 105 is communicated with the processor 101, and may display information in various manners. The receiver 106 is communicated with the processor 101, and may receive, in various manners, signaling sent by an application server or a service layer apparatus.

The foregoing computer device 100 may be a general-purpose computer device or a dedicated computer device. During specific implementation, the computer device 100 may he a desktop computer, a portable computer, a network server, a personal digital assistant (PDA), a mobile phone, a tablet computer, a wireless terminal device, a communications device, a built-in device, or a device with a structure similar to FIG. 1. This embodiment of the present invention sets no limitation to a type of the computer device 100.

Consistent with the technical solution described above, in a specific embodiment, FIG. 2 is a schematic flowchart of a network resource recommendation method including a specific execution process of a computer device. Although the network resource recommendation method described herein is executed based on the computer device 100 shown in FIG. 1, it should be noted that, a specific execution environment of the network resource recommendation method disclosed in this embodiment of the present invention is not limited to the foregoing computer device 100.

Figure 2:
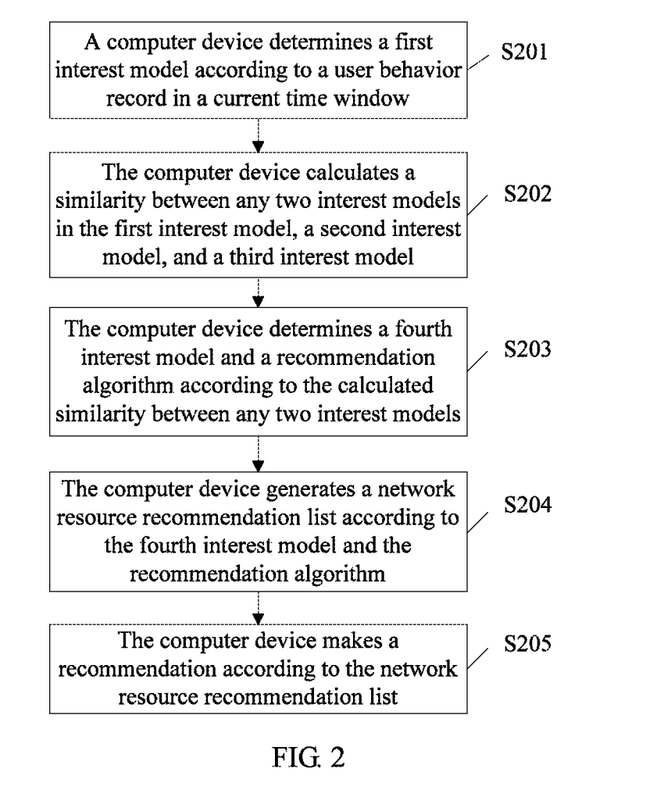
FIG. 2 is a schematic flowchart of a network resource recommendation method according to an embodiment of the present invention.

As shown in FIG. 2, the network resource recommendation method disclosed in this method embodiment of the present invention specifically includes the following steps.

S201: The computer device determines a first interest model according to a user behavior record of a current time window.

A time window refers to duration (such as 30 minutes or 1 hour) in which a user is online and has an operation record. A quantity of operation records of the user within a range of the time window needs to be not less than M. For example, M may be 3, 4, 5, 7, or another value.

The user behavior record may be an Internet behavior record, a click-through record, a purchase record, a favorites record, or the like.

An interest model may be a vector model, or may be another model, such as a rule model. The rule model includes a decision tree and the like. This is not limited in the present invention.

S202: The computer device calculates a similarity between any two interest models in the first interest model, a second interest model, and a third interest model, where a time window corresponding to the second interest model is adjacent to the current time window, the third interest model is an interest model determined based on all user behavior records in a reference time window set, the reference time window set includes N time windows prior to the time window corresponding to the second interest model, and N is an integer that is greater than 1.

The second interest model is an interest model whose time window is adjacent to the current time window and prior to the current time window. The third interest model is a long-term interest model, and is the interest model determined based on all the user behavior records in the reference time window set. That is, the third interest model is combined by interest models of the user in different time windows. A combination method includes, but is not limited to, weighted summation of multiple models, and the like.

Optionally, the interest model may be a vector model. A specific implementation in which the computer device calculates the similarity between any two interest models in the first interest model, the second interest model, and the third interest model is: calculating, by the computer device according to a second formula, a similarity between any two vector models in a first vector model, a second vector model, and a third vector model.

The second formula is:

$$similarity = \frac{A \cdot B}{\|A\| \cdot \|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

where the similarity indicates the similarity between any two vector models, A and B are any two vector models in the first vector model, the second vector model, and the third vector model, n indicates a total quantity of elements included in a vector model, and i indicates an $i^{th}$ element in the vector model.

A value in the vector model indicates a degree of preference of the user for an event (such as a commodity/service), and a larger value represents a greater interest. For example, a vector model={coffee, watch, mobile phone}={0.7, 0.2, 0.1}, and it may be learned that, degrees of commodity preference of the user are: coffee>watch>mobile phone.

For example, it is assumed that the first vector model={coffee, watch, mobile phone}={0.7, 0.2, 0.1}, the second vector model={coffee, watch, mobile phone}={0.5, 0.3, 0.2}, and the third vector model={coffee, watch, mobile phone}={0, 0.6, 0.4}. According to the second formula, the computer device calculates that a similarity between the first vector model and the second vector model is 0.949, a similarity between the first vector model and the third vector model is 0.302, and a similarity between the second vector model and the third vector model is 0.585.

S203: The computer device determines a fourth interest model and a recommendation algorithm according to the calculated similarity between any two interest models.

Figure 21:
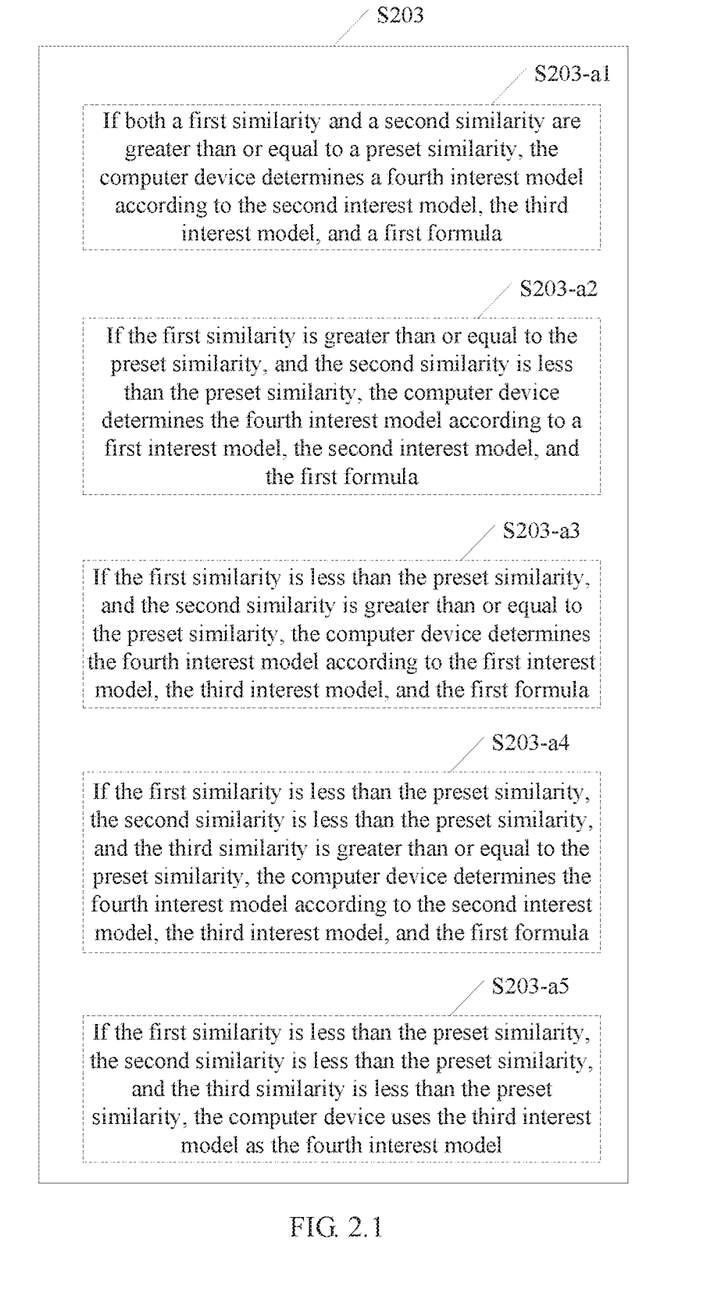

For example, referring to FIG. 2.1, the calculated similarity between any two interest models in step S202 includes a first similarity, a second similarity, and a third similarity. The first similarity is a similarity between the first interest model and the second interest model, the second similarity is a similarity between the first interest model and the third interest model, and the third similarity is a similarity between the second interest model and the third interest model. A specific implementation in which the computer device determines the fourth interest model according to the calculated similarity between any two interest models is as follows:

S203-a1: If both the first similarity and the second similarity are greater than or equal to a preset similarity, the computer device determines the fourth interest model according to the second interest model, the third interest model, and a first formula.

Specifically, if the first similarity is greater than or equal to the preset similarity, and the second similarity is greater than or equal to the preset similarity, it indicates that an event to which the user pays attention in the current time window is similar to an event to which the user pays attention in a previous time window, and that the event to which the user pays attention in the current time window is similar to an event to which the user pays attention for a long time. In this case, the computer device detects that a user interest does not significantly change, and the computer device combines the second interest model and the third interest model into the fourth interest model according to the first formula. This helps improve accuracy of an interest model for a current recommendation. The fourth interest model is the interest model for the current recommendation. The preset similarity may be equal to, for example, 0.7, 0.75, 0.8, or another value.

S203-a2: If the first similarity is greater than or equal to the preset similarity, and the second similarity is less than the preset similarity, the computer device determines the fourth interest model according to the first interest model, the second interest model, and the first formula.

Specifically, if the first similarity is greater than or equal to the preset similarity, and the second similarity is less than the preset similarity, it indicates that an event to which the user pays attention in the current time window is similar to an event to which the user pays attention in a previous time window, and that the event to which the user pays attention in the current time window is not similar to an event to which the user pays attention for a long time. In this case, the computer device detects that a user interest drifts, and the computer device combines the first interest model and the second interest model into the fourth interest model according to the first formula. This helps improve accuracy of the interest model for the current recommendation.

S203-a3: If the first similarity is less than the preset similarity, and the second similarity is greater than or equal to the preset similarity, the computer device determines the fourth interest model according to the first interest model, the third interest model, and the first formula.

Specifically, if the first similarity is less than the preset similarity, and the second similarity is greater than or equal to the preset similarity, it indicates that an event to which the user pays attention in the current time window is not similar to an event to which the user pays attention in a previous time window, and that the event to which the user pays attention in the current time window is similar to an event to which the user pays attention for a long time. In this case, the computer device detects noise (the noise indicates a non-user-interest, and is caused by an unintentional or exploratory operation of the user), and the computer device combines the first interest model and the third interest model into the fourth interest model according to the first formula. This helps improve accuracy of the interest model for the current recommendation.

S203-*a*4: If the first similarity is less than the preset similarity, the second similarity is less than the preset similarity, and the third similarity is greater than or equal to the preset similarity, the computer device determines the fourth interest model according to the second interest model, the third interest model, and the first formula.

Specifically, if the first similarity is less than the preset similarity, the second similarity is less than the preset similarity, and the third similarity is greater than or equal to the preset similarity, it indicates that an event to which the user pays attention in the current time window is not similar to an event to which the user pays attention in a previous time window, that the event to which the user pays attention in the current time window is not similar to an event to which the user pays attention for a long time, and that the event to which the user pays attention in the previous time window is similar to the event to which the user pays attention for a long time. In this case, the computer device detects that a user interest does not change, and the computer device combines the second interest model and the third interest model into the fourth interest model according to the first formula. This helps improve accuracy of the interest model for the current recommendation.

S203-*a*5: If the first similarity is less than the preset similarity, the second similarity is less than the preset similarity, and the third similarity is less than the preset similarity, the computer device uses the third interest model as the fourth interest model.

Specifically, if the first similarity is less than the preset similarity, the second similarity is less than the preset similarity, and the third similarity is less than the preset similarity, it indicates that an event to which the user pays attention in the current time window is not similar to an event to which the user pays attention in a previous time window, that the event to which the user pays attention in the current time window is not similar to an event to which the user pays attention for a long time, and that the event to which the user pays attention in the previous time window is not similar to the event to which the user pays attention for a long time. In this case, the computer device detects noise, and the computer device uses the third interest model as the fourth interest model. This helps improve accuracy of the interest model for the current recommendation.

The first formula is:

$$M = \alpha A + \beta B$$

where M indicates the fourth interest model, A and B are any two interest models in the first interest model, the second interest model, and the third interest model, $\alpha$ indicates a weight of A, $\beta$ indicates a weight of B, and a sum of $\alpha$ and $\beta$ is equal to 1.

Optionally, a value of $\alpha$ and a value of $\beta$ may be the same, or may be different. In this embodiment of the present invention, an example in which the value of $\alpha$ and the value of $\beta$ are the same is used for description, and the value of $\alpha$ and the value $\beta$ of are 1/n, where n is a quantity of to-be-combined models. For example, it is assumed that when the interest model is a vector model, the first vector model={coffee, watch, mobile phone}={0.7, 0.2, 0.1}, the second vector model={coffee, watch, mobile phone}={0.5, 0.3, 0.2}, and the first vector model and the second vector model are combined. Given $\alpha=\beta=0.5$, a combined vector model={coffee, watch, mobile phone}={0.6, 0.25, 0.15}.

Optionally, when A and B are vector models, both B are normalized vector models.

Figure 22:
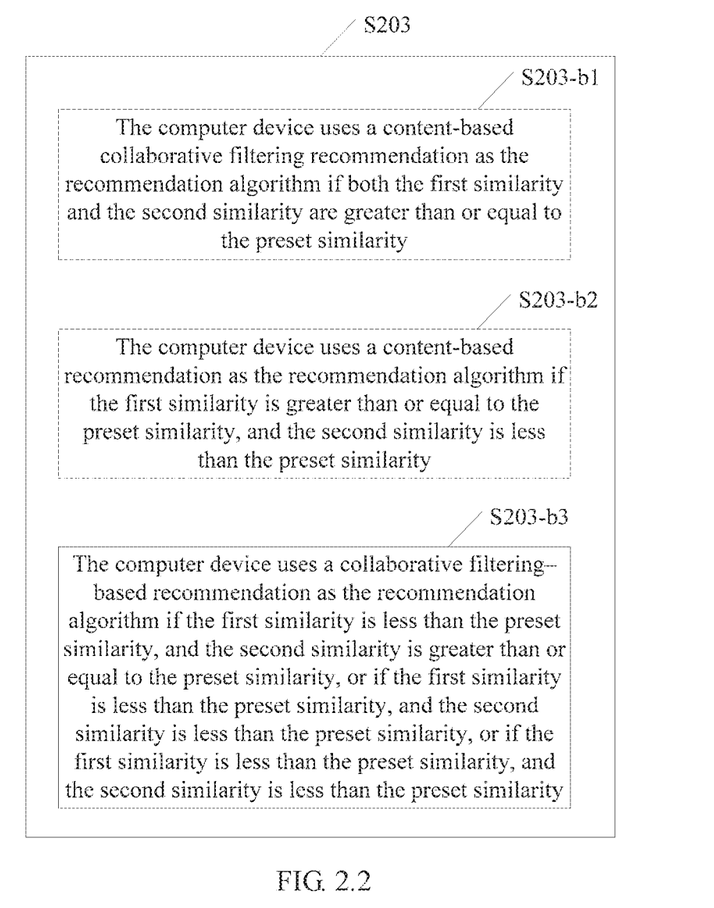

For example, referring to FIG. 2.2, a specific implementation in which the computer device determines the recommendation algorithm according to the calculated similarity between any two interest models is as follows:

S202-*b*1: The computer device uses a content-based collaborative filtering recommendation as the recommendation algorithm if both the first similarity and the second similarity are greater than or equal to the preset similarity.

S202-*b*2: The computer device uses a content-based recommendation as the recommendation algorithm if the first similarity is greater than or equal to the preset similarity, and the second similarity is less than the preset similarity.

S202-*b*3: The computer device uses a collaborative filtering-based recommendation as the recommendation algorithm if the first similarity is less than the preset similarity, and the second similarity is greater than or equal to the preset similarity, or if the first similarity is less than the preset similarity, and the second similarity is less than the preset similarity, or if the first similarity is less than the preset similarity, and the second similarity is less than the preset similarity.

The content-based recommendation means offering an unfamiliar recommendation item to a user according to a browsing history of the user. A content-based recommendation method is described mainly by using a heuristic method and a model-based method. The collaborative filtering-based recommendation is making a recommendation based on a group of users or items with a same interest, to generate a recommendation list for a target user according to preference information of a neighbor user (a user having a similar interest with the target user). A collaborative filtering algorithm is mainly classified into a user-based collaborative filtering algorithm and an item-based collaborative filtering algorithm. The content-based collaborative filtering recommendation is a hybrid recommendation method of the content-based recommendation and the collaborative filtering-based recommendation.

When the computer device detects that the interest does not significantly change, the computer device uses the content-based collaborative filtering recommendation, and can ensure sensitivity to a current short-term interest while making a recommendation based on a long-term interest, thereby improving accuracy of the recommendation.

When the computer device detects that the interest changes, the computer device uses the content-based recommendation, and can make a better recommendation according to a current short-term interest and capture a current new interest of a user, thereby improving accuracy of the recommendation.

When the computer device detects noise or detects that the interest does not change, the computer device uses the collaborative filtering-based recommendation, and can ensure diversity of a recommendation to the maximum extent, thereby improving a success rate of the recommendation.

Optionally, after the computer device determines the fourth interest model according to the second interest model, the third interest model, and the first formula, the computer device updates the third interest model to the fourth interest model. The fourth interest model is used as the interest model for the current recommendation.

Optionally, after the computer device determines the fourth interest model according to the first interest model, the second interest model, and the first formula, the computer device determines a fifth interest model according to the second interest model, the third interest model, and the first formula, and updates the third interest model to the fifth interest model. The fourth interest model is used as the interest model for the current recommendation, and the fifth interest model is used as the long-term interest model.

It should be noted that, if the first similarity is less than the preset similarity, and the second similarity is greater than or equal to the preset similarity, or if the first similarity is less than the preset similarity, the second similarity is less than the preset similarity, and the third similarity is less than the preset similarity, the computer device detects the noise, and in this case, the computer device does not need to update the third interest model.

For example, when the interest model is a vector model, it is assumed that the first vector model={coffee, watch, mobile phone}={0.7, 0.2, 0.1}, the second vector model={coffee, watch, mobile phone}={0.5, 0.3, 0.2}, and the third vector model={coffee, watch, mobile phone}={0, 0.6, 0.4}. According to the second formula, the computer device calculates that the first similarity is 0.949, the second similarity is 0.302, and the third similarity is 0.585. If the preset similarity is 0.7, it may be learned according to step S202 that, the computer device detects that the user interest drills, and the computer device determines a fourth vector model according to the first vector model, the second vector model, and the first formula and based on step S203-$a2$. The fourth vector model={coffee, watch, mobile phone}={0.6, 0.25, 0.15}. The computer device determines a fifth vector model according to the second vector model, the third vector model, and the first formula, and updates the third vector model to the fifth vector model. The fifth vector model={coffee, watch, mobile phone}={0.25, 0.45, 0.3}. In this case, the third vector model={coffee, watch, mobile phone}={0.25, 0.45, 0.3}. The computer device uses the content-based recommendation as the recommendation algorithm for the current recommendation. Because it is detected that the user interest drifts, the content-based recommendation is used, a better recommendation can be made according to a current short-term interest, and a current new interest of a user can be captured, thereby improving accuracy of the recommendation. Because a preference value of {coffee} in the vector model for the current recommendation is largest, the content-based recommendation is focused on the interest {coffee}.

For another example, when the interest model is a vector model, it is assumed that the first vector model={coffee, watch, mobile phone}={0.7, 0.2, 0.1}, the second vector model={coffee, watch, mobile phone}={0, 0.3, 0.7}, and the third vector model={coffee, watch, mobile phone}={0, 0.8, 0.2}. According to the second formula, the computer device calculates that the first similarity is 0.232, the second similarity is 0.297, and the third similarity is 0.605. If the preset similarity is 0.7, it may be learned according to step S202 that, the computer device detects the noise, and the computer device uses the third vector model as the fourth vector model, that is, the fourth vector model={coffee, watch, mobile phone}={0, 0.8, 0.2}. The computer device uses the collaborative filtering-based recommendation as the recommendation algorithm for the current recommendation. Because the computer device detects the noise, the collaborative filtering-based recommendation is used, and diversity of a recommendation can be ensured to the maximum extent, thereby improving a success rate of the recommendation.

For still another example, when the interest model is a vector model, it is assumed that the first vector model={coffee, watch, mobile phone}={0.7, 0.2, 0.1}, the second vector model={coffee, watch, mobile phone}={0, 0.3, 0.7}, and the third vector model={coffee, watch, mobile phone}={0.8, 0.1, 0.1}. According to the second formula, the computer device calculates that the first similarity is 0.232, the second similarity is 0.988, and the third similarity is 0.162. If the preset similarity is 0.7, it may be learned according to step S202 that, the computer device detects that the user interest does not change, and the computer device determines a fourth vector model according to the second vector model, the third vector model, and the first formula. The fourth vector model={coffee, watch, mobile phone}={0.75, 0.1.5, 0.1}. The computer device updates the third vector model to the fourth vector model, and in this case, the third vector model={coffee, watch, mobile phone}={0.75, 0.15, 0.1}. The computer device uses the content-based collaborative filtering recommendation as the recommendation algorithm for the current recommendation. Because the computer device detects that the user interest does not change, the collaborative filtering-based recommendation is used, diversity of a recommendation can be ensured to the maximum extent, thereby improving a success rate of the recommendation.

S204: The computer device generates a network resource recommendation list according to the fourth interest model and the recommendation algorithm.

S205: The computer device makes a recommendation according to the network resource recommendation list.

Specifically, a specific implementation in which the computer device makes the recommendation according to the network resource recommendation list may be as follows: The computer device directly makes the recommendation according to the foregoing network resource recommendation list; or the computer device sends the foregoing network resource recommendation list to another computer device (for example, a smartphone or a tablet computer), and then the another computer device makes a recommendation according to the foregoing network resource recommendation list; or there may be another recommendation manner. This is not limited in the present invention.

It may be learned that, in this embodiment of the present invention, an interest model for a current recommendation is determined not according to feedback information of a user for a network resource recommendation list, but according to a user behavior record, thereby responding to a user interest change in an accurate and timely manner, and improving accuracy of a recommendation result.

Figure 3:
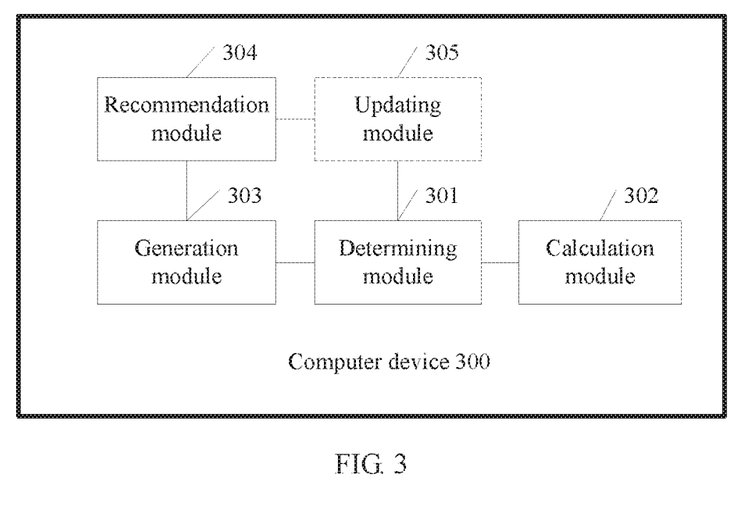
FIG. 3 is a schematic diagram of another computer device according to an embodiment of the present invention.

FIG. 3 is a schematic structural diagram of a computer device according to an embodiment of the present invention. A computer device 300 includes a determining module 301, a calculation module 302, a generation module 303, and a recommendation module 304.

The determining module 301 is configured to determine a first interest model according to a user behavior record in a current time window. The calculation module 302 is configured to calculate a similarity between any two interest models in the first interest model, a second interest model, and a third interest model. A time window corresponding to the second interest model is adjacent to the current time window The third interest model is an interest model determined based on all user behavior records in a reference time window set, the reference time window set includes N time windows prior to the time window corresponding to the second interest model, and N is an integer that is greater than 1. The determining module 301 is further configured to determine a fourth interest model and a recommendation algorithm according to the similarity that is between any two interest models and calculated by the calculation module. The generation module 303 is configured to generate a network resource recommendation list according to the fourth interest model and the recommendation algorithm that are determined by the determining module. The recommendation module 304 is configured to make a recommendation according to the network resource recommendation list.

Optionally, the calculated similarity between any two interest models includes a first similarity, a second similarity, and a third similarity, the first similarity is a similarity between the first interest model and the second interest model, the second similarity is a similarity between the first interest model and the third interest model, and the third similarity is a similarity between the second interest model and the third interest model.

Optionally, the determining module 301 is specifically configured to:

if both the first similarity and the second similarity are greater than or equal to a preset similarity, determine the fourth interest model according to the second interest model, the third interest model, and a first formula;

if the first similarity is greater than or equal to the preset similarity, and the second similarity is less than the preset similarity, determine the fourth interest model according to the first interest model, the second interest model, and the first formula;

if the first similarity is less than the preset similarity, and the second similarity is greater than or equal to the preset similarity, determine the fourth interest model according to the first interest model, the third interest model, and the first formula;

if the first similarity is less than the preset similarity, the second similarity is less than the preset similarity, and the third similarity is greater than or equal to the preset similarity, determine the fourth interest model according to the second interest model, the third interest model, and the first formula; or if the first similarity is less than the preset similarity, the second similarity is less than the preset similarity, and the third similarity is less than the preset similarity, use the third interest model as the fourth interest model, where the first formula is:

$$M = \alpha a = \beta B$$

where M indicates the fourth interest model, A and B are any two interest models in the first interest model, the second interest model, and the third interest model, $\alpha$ indicates a weight of A, $\beta$ indicates a weight of B, and a sum of $\alpha$ and $\beta$ is equal to 1.

Optionally, after the determining module 301 determines the fourth interest model according to the second interest model, the third interest model, and the first formula, the computer device shown in FIG. 3 further includes:

an updating module, configured to update the third interest model to the fourth interest model.

Optionally, after the determining module 301 determines the fourth interest model according to the first interest model, the second interest model, and the first formula, the determining module 301 is further configured to determine a fifth interest model according to the second interest model, the third interest model, and the first formula. The updating module 305 is further configured to update the third interest model to the fifth interest model determined by the determining module 301.

Optionally, the determining module 301 is further specifically configured to:

use a content-based collaborative filtering recommendation as the recommendation algorithm if both the first similarity and the second similarity are greater than or equal to a preset similarity;

use a content-based recommendation as the recommendation algorithm if the first similarity is greater than or equal to the preset similarity, and the second similarity is less than the preset similarity; or use a collaborative filtering-based recommendation as the recommendation algorithm if the first similarity is less than the preset similarity, and the second similarity is greater than or equal to the preset similarity, or if the first similarity is less than the preset similarity, and the second similarity is less than the preset similarity, or if the first similarity is less than the preset similarity, and the second similarity is less than the preset similarity.

Optionally, the interest model may be a vector model, and the calculation module 302 is specifically configured to: calculate, according to a second formula, a similarity between any two vector models in a first vector model, a second vector model, and a third vector model.

The second formula is:

$$\text{similarity} = \frac{A \cdot B}{\|A\| \cdot \|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

where the similarity indicates the similarity between any two vector models, A and B are any two vector models in the first vector model, the second vector model, and the third vector model, n indicates a total quantity of elements included in a vector model, and i indicates an $i^{th}$ element in the vector model.

It should be noted that, the foregoing functional modules (the determining module 301, the calculation module 302, the generation module 303, the recommendation module 304, and the updating module 305) are configured to perform related steps in steps S201 to S205 of the embodiment shown in FIG. 2.

In this embodiment, the computer device 300 is presented in a form of functional modules. "Modules" herein may be an application-specific integrated circuit (ASIC), a circuit, a processor and a memory that are configured to execute one or more software or firmware programs, an integrated logic circuit, and/or another component capable of providing the foregoing functions. In a simple embodiment, a person skilled in the art may come up with an idea that the computer device 300 may use the form shown in FIG. 1. The determining module 301, the calculation module 302, the generation module 303, and the updating module 305 may be implemented by using the processor and the memory in FIG. 1. The recommendation module 304 may be implemented by using the processor, the memory, and the communications interface in FIG. 1.

The embodiments of the present invention further provide a computer storage medium. The computer storage medium may store a program, and when the program is executed, some or all of the steps of any network resource recommendation method recorded in the foregoing method embodiments may be performed.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic or other forms.

The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions of the embodiments.

In addition, functional modules in the embodiments of the present invention may be integrated into one processing module, or each of the modules may exist alone physically, or two or more modules are integrated into one module. The foregoing integrated module may be implemented in a form of hardware, or may be implemented in a form of a software functional module.

When the integrated module is implemented in the form of a software functional module and sold or used as an independent product, the integrated unit may be stored in a computer-readable memory. Based on such an understanding, the technical solutions of the present invention essentially, or the part contributing to the prior art, or all or a part of the technical solutions may be implemented in the form of a software product. The computer software product is stored in a memory and includes several instructions for instructing a computer device (which may be a personal computer, a server, or a network device) to perform all or a part of the steps of the methods described in the embodiments of the present invention. The foregoing memory includes: any medium that can store program code, such as a USB flash drive, a read-only memory (ROM), a random access memory (RAM), a removable hard disk, a magnetic disk, or an optical disc.

A person of ordinary skill in the art may understand that all or some of the steps of the methods in the foregoing embodiments may be implemented by a program instructing relevant hardware. The program may be stored in a computer readable memory. The memory may include a flash memory, a read-only memory (ROM), a random access memory (RAM), a magnetic disk, an optical disc or the like.

The embodiments of the present invention are described in detail above. The principle and implementation of the present invention are described herein by using specific examples. The description about the foregoing embodiments is merely provided to help understand the method and core ideas of the present invention. In addition, a person of ordinary skill in the art can make variations and modifications to the present invention in terms of the specific implementations and application scopes according to the ideas of the present invention. Therefore, the content of the specification shall not be construed as a limit to the present invention.

What is claimed is:

1. A network resource recommendation method, comprising:
    determining a first interest model according to a user behavior record in a current time window;
    calculating similarities between any two interest models among the first interest model, a second interest model, and a third interest model, wherein a time window corresponding to the second interest model is adjacent to the current time window, the third interest model is an interest model determined based on user behavior records in a reference time window set, the reference time window set comprises N time windows prior to the time window corresponding to the second interest model, and N is an integer that is greater than 1;
    determining a fourth interest model according to the first interest model, the second interest model and third interest model and the calculated similarities, and determining a recommendation algorithm according to the calculated similarities;
    generating a network resource recommendation list according to the fourth interest model and the recommendation algorithm; and
    generating a recommendation according to the network resource recommendation list.

2. The method according to claim 1, wherein the calculated similarities comprise a first similarity, a second similarity, and a third similarity, the first similarity is a similarity between the first interest model and the second interest model, the second similarity is a similarity between the first interest model and the third interest model, and the third similarity is a similarity between the second interest model and the third interest model.

3. The method according to claim 2, wherein the determining the fourth interest model according to the first interest model, the second interest model and the third interest model and the calculated similarities comprises:
    if both the first similarity and the second similarity are greater than or equal to a preset similarity, determining the fourth interest model according to the second interest model, the third interest model, and a first formula;
    if the first similarity is greater than or equal to the preset similarity, and the second similarity is less than the preset similarity, determining the fourth interest model according to the first interest model, the second interest model, and the first formula;
    if the first similarity is less than the preset similarity, and the second similarity is greater than or equal to the preset similarity, determining the fourth interest model according to the first interest model, the third interest model, and the first formula;
    if the first similarity is less than the preset similarity, the second similarity is less than the preset similarity, and the third similarity is greater than or equal to the preset similarity, determining the fourth interest model according to the second interest model, the third interest model, and the first formula; or if the first similarity is less than the preset similarity, the second similarity is less than the preset similarity, and the third similarity is less than the preset similarity, using the third interest model as the fourth interest model, wherein the first formula is:

$$M=\alpha A+\beta B$$

wherein M indicates the fourth interest model, A and B are any two interest models in the first interest model, the second interest model, and the third interest model, α indicates a weight of A, β indicates a weight of B, and a sum of α and β is equal to 1.

4. The method according to claim 3, wherein after the determining the fourth interest model according to the second interest model, the third interest model, and the first formula, the method further comprises:

updating the third interest model to the fourth interest model.

5. The method according to claim 3, wherein after the determining the fourth interest model according to the first interest model, the second interest model, and the first formula, the method further comprises:

determining a fifth interest model according to the second interest model, the third interest model, and the first formula; and updating the third interest model to the fifth interest model.

6. The method according to claim 2, wherein the determining the recommendation algorithm according to the calculated similarities comprises:

using a content-based collaborative filtering recommendation as the recommendation algorithm if both the first similarity and the second similarity are greater than or equal to a preset similarity;

using a content-based recommendation as the recommendation algorithm if the first similarity is greater than or equal to the preset similarity, and the second similarity is less than the preset similarity; or using a collaborative filtering-based recommendation as the recommendation algorithm if the first similarity is less than the preset similarity, and the second similarity is greater than or equal to the preset similarity, or if the first similarity is less than the preset similarity, and the second similarity is less than the preset similarity, and the third similarity is greater than or equal to the preset similarity, or if the first similarity is less than the preset similarity, and the second similarity is less than the preset similarity, and the third similarity is less than the preset similarity.

7. The method according to claim 1, wherein the first interest model comprises a first vector model, the second interest model comprises a second vector model, the third interest model comprises a third vector model, and the calculating the similarities between any two interest models in the first interest model, the second interest model, and the third interest model comprises:

calculating, according to a second formula, a similarity between any two vector models among the first vector model, the second vector model, and the third vector model, wherein the second formula is:

$$\text{similarity}=\frac{A \cdot B}{\|A\| \cdot \|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

wherein the similarity indicates the similarity between any two vector models, A and B are any two vector models in the first vector model, the second vector model, and the third vector model, n indicates a total quantity of elements comprised in a vector model, and i indicates an $i^{th}$ element in the vector model.

8. A computer device, comprising:

a processor and a memory, wherein the processor invokes code or an instruction in the memory to perform the following steps:

determining a first interest model according to a user behavior record in a current time window;

calculating similarities between any two interest models among the first interest model, a second interest model, and a third interest model, wherein a time window corresponding to the second interest model is adjacent to the current time window, the third interest model is an interest model determined based on all user behavior records in a reference time window set, the reference time window set comprises N time windows prior to the time window corresponding to the second interest model, and N is an integer that is greater than 1;

determining a fourth interest model according to the first interest model, the second interest model and the third interest model and the calculated similarities, and determining a recommendation algorithm according to the similarities;

generating a network resource recommendation list according to the fourth interest model and the recommendation algorithm; and generating a recommendation according to the network resource recommendation list.

9. The computer device according to claim 8, wherein the calculated similarities comprise a first similarity, a second similarity, and a third similarity, the first similarity is a similarity between the first interest model and the second interest model, the second similarity is a similarity between the first interest model and the third interest model, and the third similarity is a similarity between the second interest model and the third interest model.

10. The computer device according to claim 9, wherein the processor performing the step of determining the fourth interest model according to the calculated similarity between any two interest models comprises the processor performing the step of:

if both the first similarity and the second similarity are greater than or equal to a preset similarity, determining the fourth interest model according to the second interest model, the third interest model, and a first formula;

if the first similarity is greater than or equal to the preset similarity, and the second similarity is less than the preset similarity, determining the fourth interest model according to the first interest model, the second interest model, and the first formula;

if the first similarity is less than the preset similarity, and the second similarity is greater than or equal to the preset similarity, determining the fourth interest model according to the first interest model, the third interest model, and the first formula;

if the first similarity is less than the preset similarity, the second similarity is less than the preset similarity, and the third similarity is greater than or equal to the preset similarity, determining the fourth interest model according to the second interest model, the third interest model, and the first formula; or if the first similarity is less than the preset similarity, the second similarity is less than the preset similarity, and the third similarity is less than the preset similarity, using the third interest model as the fourth interest model, wherein the first formula is:

$$M=\alpha A+\beta B$$

wherein M indicates the fourth interest model, A and B are any two interest models in the first interest model, the second interest model, and the third interest model, $\alpha$ indicates a weight of A, $\beta$ indicates a weight of B, and a sum of $\alpha$ and $\beta$ is equal to 1.

11. The computer device according to claim 10, wherein after the processor determines the fourth interest model according to the second interest model, the third interest model, and the first formula, the processor further invokes the code or the instruction in the memory to:

update the third interest model to the fourth interest model.

12. The computer device according to claim 10, wherein after the processor determines the fourth interest model according to the first interest model, the second interest model, and the first formula, the processor further invokes the code or the instruction in the memory to:

determine a fifth interest model according to the second interest model, the third interest model, and the first formula; and update the third interest model to the fifth interest model.

13. The computer device according to claim 9, wherein the processor performing the step of determining the recommendation algorithm according to the calculated similarity between any two interest models comprises the processor performing the step of:

using a content-based collaborative filtering recommendation as the recommendation algorithm if both the first similarity and the second similarity are greater than or equal to a preset similarity;

using a content-based recommendation as the recommendation algorithm if the first similarity is greater than or equal to the preset similarity, and the second similarity is less than the preset similarity; or using a collaborative filtering-based recommendation as the recommendation algorithm if the first similarity is less than the preset similarity, and the second similarity is greater than or equal to the preset similarity, or if the first similarity is less than the preset similarity, and the second similarity is less than the preset similarity, and the third similarity is greater than or equal to the preset similarity, or if the first similarity is less than the preset similarity, and the second similarity is less than the preset similarity, and the third similarity is less than the preset similarity.

14. The computer device according to claim 8, wherein the first interest model comprises a first vector model, the second interest model comprises a second vector model, the third interest model comprises a third vector model, and the processor performing the step of calculating the similarity between any two interest models in the first interest model, the second interest model, and the third interest model comprises the processor performing the step of:

calculating, according to a second formula, a similarity between any two vector models among the first vector model, the second vector model, and the third vector model, wherein the second formula is:

$$\text{similarity} = \frac{A \cdot B}{\|A\| \cdot \|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

wherein the similarity indicates the similarity between any two vector models, A and B are any two vector models in the first vector model, the second vector model, and the third vector model, n indicates a total quantity of elements comprised in a vector model, and i indicates an $i^{th}$ element in the vector model.

* * * * *